(12) United States Patent
Liu et al.

(10) Patent No.: US 8,961,654 B2
(45) Date of Patent: Feb. 24, 2015

(54) REDUCTION OF MERCURY EMISSIONS FROM CEMENT PLANTS

(75) Inventors: Xin Liu, Beijing (CN); Jon E. Miller, Baton Rouge, LA (US); Zhong Tang, Baton Rouge, LA (US); Qunhui Zhou, Baton Rouge, LA (US); Yinzhi Zhang, Baton Rouge, LA (US); Kara M. Thalls, Reminderville, OH (US)

(73) Assignee: Albemarle Corporation, Baton Rouge, LA (US)

( * ) Notice: Subject to any disclaimer, the term of this patent is extended or adjusted under 35 U.S.C. 154(b) by 15 days.

(21) Appl. No.: 13/885,052

(22) PCT Filed: Dec. 9, 2011

(86) PCT No.: PCT/US2011/064093
§ 371 (c)(1),
(2), (4) Date: May 13, 2013

(87) PCT Pub. No.: WO2012/082539
PCT Pub. Date: Jun. 21, 2012

(65) Prior Publication Data
US 2013/0220120 A1     Aug. 29, 2013

Related U.S. Application Data

(60) Provisional application No. 61/424,149, filed on Dec. 17, 2010.

(51) Int. Cl.
*B01D 53/02* (2006.01)
*B01D 53/10* (2006.01)
*C04B 7/36* (2006.01)

(52) U.S. Cl.
CPC ............... *B01D 53/10* (2013.01); *C04B 7/365* (2013.01); *B01D 2253/102* (2013.01); *B01D 2257/602* (2013.01); *B01D 2258/0233* (2013.01)
USPC ............................................. 95/134

(58) Field of Classification Search
USPC ............................................. 95/134
See application file for complete search history.

(56) References Cited

U.S. PATENT DOCUMENTS

| | | |
|---|---|---|
| 1,984,164 A | 12/1934 | Alfred |
| 4,500,327 A | 2/1985 | Nishino et al. |
| 5,264,013 A | 11/1993 | Brentrup |

(Continued)

FOREIGN PATENT DOCUMENTS

| | | |
|---|---|---|
| JP | 2002355531 A | 12/2002 |
| JP | 2007015875 A | 1/2007 |

(Continued)

*Primary Examiner* — Christopher P Jones
(74) *Attorney, Agent, or Firm* — Marcy M. Hoefling

(57) ABSTRACT

This invention provides methods for reducing emissions of mercury from a cement plant comprising at least a kiln (6), a particulate collection device (10), collected particulates, an exhaust gas stream (8b), a heater, and a mercury scrubber, wherein the heater and mercury scrubber are upstream from the kiln. The methods comprise directing the collected particulates through the heater, to form volatilized mercury species from the collected particulates; directing the collected particulates from the heater downstream toward the kiln; and directing the volatilized mercury species to the mercury scrubber. The exhaust gas stream (8c) exits the particulate collection device and is not directed into the heater. Optional steps include injecting a mercury sorbent at one or more points between the kiln and the particulate collection device.

16 Claims, 2 Drawing Sheets

(56) References Cited

U.S. PATENT DOCUMENTS

| | | | |
|---|---|---|---|
| 5,900,042 | A | 5/1999 | Mendelsohn et al. |
| 6,514,907 | B2 | 2/2003 | Tsutsumi et al. |
| 6,808,692 | B2 | 10/2004 | Oehr |
| 6,818,043 | B1 | 11/2004 | Chang et al. |
| 6,848,374 | B2 | 2/2005 | Srinivasachar |
| 6,878,358 | B2 | 4/2005 | Vosteen et al. |
| 6,953,494 | B2 | 10/2005 | Nelson, Jr. |
| 7,615,101 | B2 | 11/2009 | Holmes et al. |
| 7,794,524 | B2 | 9/2010 | Jepsen et al. |
| 7,858,061 | B2 | 12/2010 | Varma et al. |
| 8,017,550 | B2 | 9/2011 | Chao et al. |
| 8,069,797 | B2 | 12/2011 | Srinivasachar et al. |
| 8,133,303 | B2 | 3/2012 | Schwab et al. |
| 2002/0114749 | A1 | 8/2002 | Cole |
| 2005/0039598 | A1 | 2/2005 | Srinivasachar et al. |
| 2006/0057044 | A1 | 3/2006 | Chang et al. |
| 2006/0204418 | A1 | 9/2006 | Chao et al. |
| 2006/0205592 | A1 | 9/2006 | Chao et al. |
| 2007/0051239 | A1 | 3/2007 | Holmes et al. |
| 2007/0140940 | A1 | 6/2007 | Varma et al. |
| 2007/0180990 | A1 | 8/2007 | Downs et al. |
| 2007/0254807 | A1 | 11/2007 | Bisque et al. |
| 2009/0193968 | A1 | 8/2009 | Jepsen et al. |
| 2010/0000406 | A1 | 1/2010 | Schwab et al. |

FOREIGN PATENT DOCUMENTS

| | | |
|---|---|---|
| JP | 2009202106 A | 9/2009 |
| JP | 2010235334 A | 10/2010 |
| WO | 2010104989 A1 | 9/2010 |

REDUCTION OF MERCURY EMISSIONS FROM CEMENT PLANTS

REFERENCE TO RELATED APPLICATIONS

This application is the National Stage of International Patent Application PCT/US2011/064093, filed on Dec. 9, 2011, which application claims priority from U.S. Application No. 61/424,149, filed Dec. 17, 2010, the disclosures of which are incorporated herein by reference.

TECHNICAL FIELD

This invention relates to reduction of mercury emissions from cement plants.

BACKGROUND

Research into sources of mercury emissions in the U.S. has resulted in the identification of cement producing facilities as significant emission source of mercury. Currently, cement plants are the fourth largest sources of mercury emissions in the U.S. The U.S. Environmental Protection Agency (EPA) has proposed a rule to limit mercury emissions from cement plants. The proposed rule sets forth the first limits on mercury emissions from existing cement plants and strengthens the limits for new plants. The proposed rule sets mercury emission limits for existing sources at 26 pounds of mercury per million tons of feed (~13 kg/million tons) or 43 pounds of mercury per million tons of clinker produced (~21.5 kg/million tons). For new cement plants, the mercury emission limit is 14 pounds of mercury per million tons of clinker produced (~7.0 kg/million tons). The proposed rule is set to take effect in 2013. The EPA estimates that when the rule is fully implemented, annual emissions of mercury from cement plants will be reduced by at least 81%.

It is known that activated carbon can be injected into a gas stream containing mercury vapor. When mercury vapor contacts activated carbon particles, the mercury is captured and held by the activated carbon particles. The particles are then collected by a particulate collection device, such as an electrostatic precipitator or a baghouse filter. The mercury captured by the activated carbon particles appears to be stably bonded to the particles. In cement plant operations, the particulates captured by the control device are normally recycled to the cement production process.

In cement plants, mercury volatilizes from the raw material. A majority of the volatilized mercury ends up in the cement dust. Typically, the exhaust gas stream from the cement production process contains particulates, and these particulates are normally collected by the particulate collection device, usually a fabric filter or an electrostatic precipitator. Collected particulates from the cement production process, which include the cement dust, are often recycled from the particulate collection device and used as part of the raw material feed, where the mercury is again volatilized as the raw material is heated. Thus, recycling the cement dust to the raw material feed continually re-introduces mercury into the cement production process and thereby into cement dust and the accompanying exhaust gas stream.

In addition, the exhaust gas itself is sometimes recycled to the cement production process. The exhaust gas typically contains a small amount of mercury; returning the exhaust gas to the raw mill introduces additional mercury to the raw material feed.

Relatively inexpensive and yet effective ways to reduce mercury emissions from cement plants are quite desirable.

SUMMARY OF THE INVENTION

This invention provides methods for reducing the emissions of mercury from cement plants at relatively low cost. One advantage is that the methods provided herein can be incorporated into existing cement plants without requiring extensive reconfiguration. Another advantage of the methods described herein is the removal of mercury early in the cement-making process, which can minimize the need for additional mercury control downstream.

An embodiment of this invention is a method for reducing emissions of mercury from a cement plant comprising at least a kiln, a particulate collection device, collected particulates, an exhaust gas stream, a heater, and a mercury scrubber, wherein the heater and mercury scrubber are upstream from the kiln. The method comprises
  directing the collected particulates through the heater, to form volatilized mercury species from the collected particulates;
  directing the collected particulates from the heater downstream toward the kiln; and
  directing the volatilized mercury species to the mercury scrubber.

The exhaust gas stream exits the particulate collection device and is not directed into the heater. An optional step is the injecting of a mercury sorbent at one or more points between the kiln and the particulate collection device.

These and other embodiments and features of this invention will be still further apparent from the ensuing description, drawings, and appended claims.

FURTHER DETAILED DESCRIPTION OF THE INVENTION

As used throughout this document, the term "collected particulates" refers to the particulates collected by the particulate collection device of the cement plant, and includes the cement dust.

Figure 1:
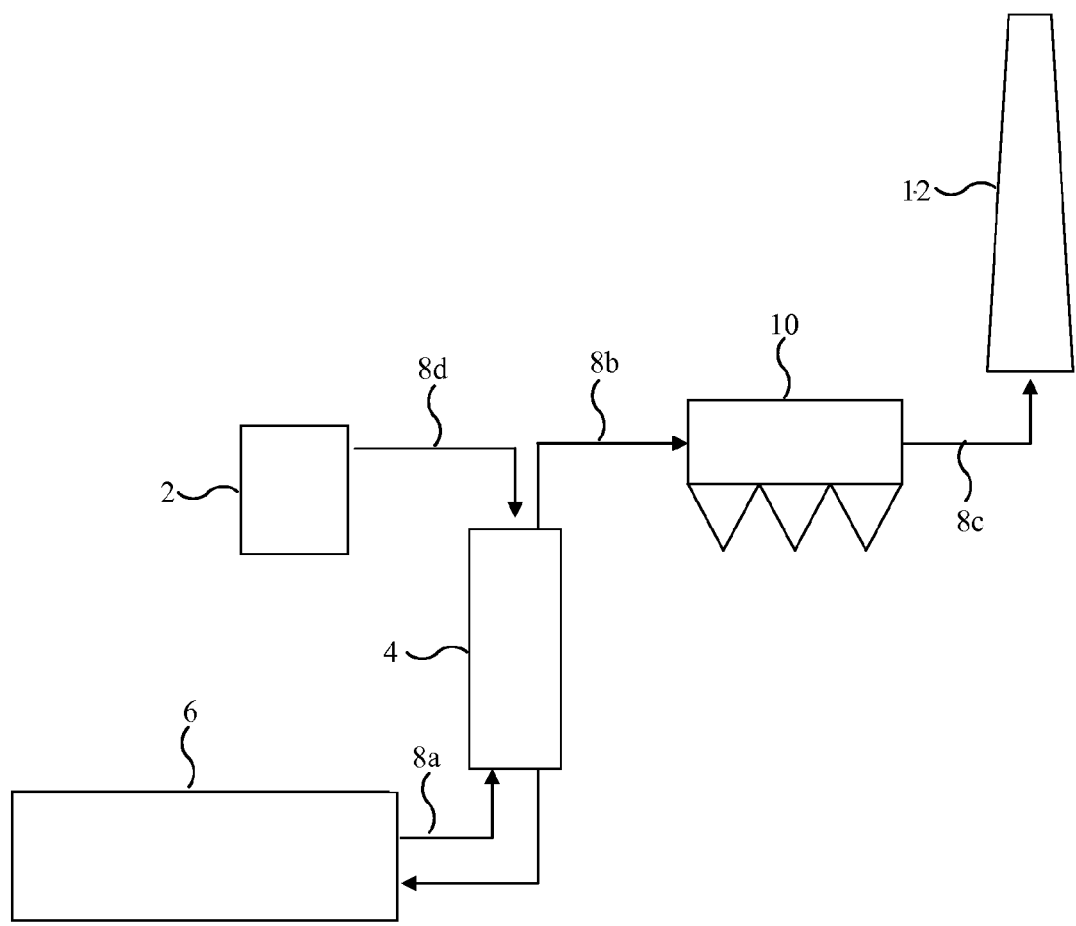
FIG. 1 is a schematic diagram of a generalized cement plant configuration.

The configurations of cement plants vary, but have several features in common. A generalized cement plant configuration showing pertinent parts is shown in FIG. 1. In cement plants having a raw material mill and a preheater tower, raw material feed 8d from the raw material mill 2 (raw mill) is fed to the top of the preheater tower 4 (sometimes called a precalciner tower) and from the preheater tower 4 into the kiln 6. Clinker is produced in the kiln, and is discharged from the kiln. A gas stream 8a exits from the kiln 6. The gas stream 8a enters the bottom of the preheater tower 4 and exits from the top of the preheater tower 4. The exhaust gas stream 8b is then cooled, usually by water, often in a conditioning tower and the cooled exhaust gas stream 8b instead travels to a particulate collection device 10. After passing through the particulate collection device 10, the exhaust gas stream 8c exits the cement plant by traveling through the stack 12.

The Figures are not intended to be construed as limiting the inventions. For example, the methods described herein apply to cement plants that do not have a raw material mill and/or a preheater tower.

Throughout this document, the phrase "downstream toward the kiln" refers to the various possible combinations for the recycled collected particulates. The collected particulates can be combined with the raw material feed at any point downstream from the heater from which the collective particulates are exiting. Alternatively, the collected particulates can be recycled to the raw mill rather than into the raw material feed. In cement plants having preheater towers, the collected particulates can be combined with the raw material feed before or after the preheater tower. In other embodiments, the collected particulates can be recycled directly to the kiln. The phrase "downstream toward the kiln" encompasses all of these possibilities.

In the methods of the invention, mercury emissions from cement plants are reduced. The cement plants comprise at least a kiln, a particulate collection device, collected particulates, an exhaust gas stream, a heater, and a mercury scrubber, which heater and mercury scrubber are upstream from the kiln. In the methods, the collected particulates are directed through the heater. In the heater, the collected particulates are heated to a temperature high enough to volatilize the mercury present in the collected particulates, which forms volatilized mercury species from the collected particulates. The collected particulates are directed downstream toward the kiln, where they are normally combined with the raw material feed, or introduced into the raw mill, the preheater tower, or the kiln; preferably, the collected particulates are introduced into the kiln. The volatilized mercury species, which are normally in a gas stream, are directed to the mercury scrubber, which removes the mercury, usually from a gas stream.

Generally, particulates from the cement manufacturing process are carried by the exhaust gas stream to the particulate collection device, where the particulates are removed from the exhaust gas stream. The collected particulates are directed to the heater, as just described, but the exhaust gas stream exits the particulate collection device and is not directed into the heater.

Another method of this invention is for reducing emissions of mercury from a cement plant comprising at least a kiln, a particulate collection device, collected particulates, and an exhaust gas stream. The method comprises placing a heater upstream of the kiln such that the collected particulates will travel through the heater downstream to the kiln;

placing a mercury scrubber downstream from the heater such that volatilized mercury species formed from the collected particulates can enter the mercury scrubber from the heater;

directing the collected particulates through the heater, to form volatilized mercury species from the collected particulates;

directing the collected particulates from the heater downstream toward the kiln; and directing the volatilized mercury species to the mercury scrubber.

The exhaust gas stream exits the particulate collection device and is not directed into the heater.

Figure 2A:
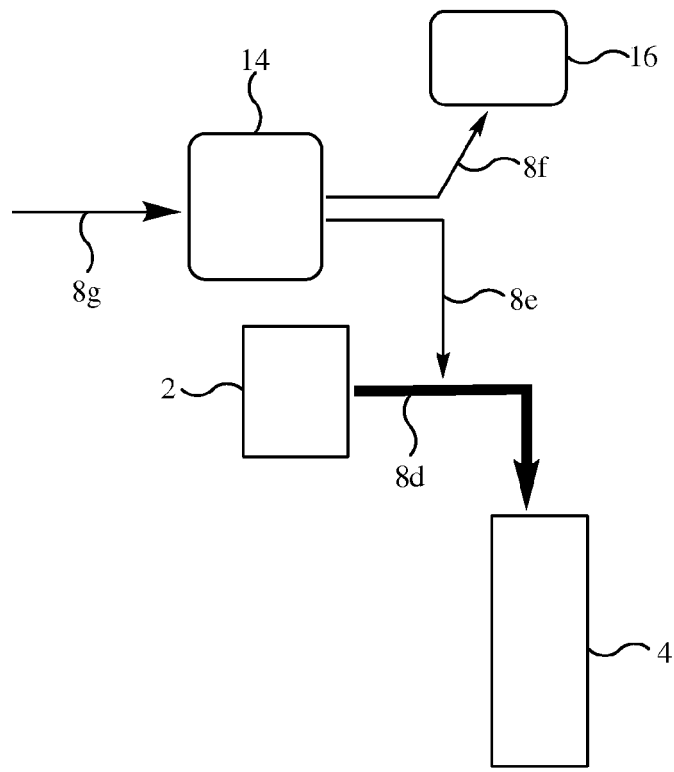
FIG. 2A is a schematic diagram showing the placement of the heater and mercury scrubber when a preheater tower is present in the cement plant.
Figure 2B:
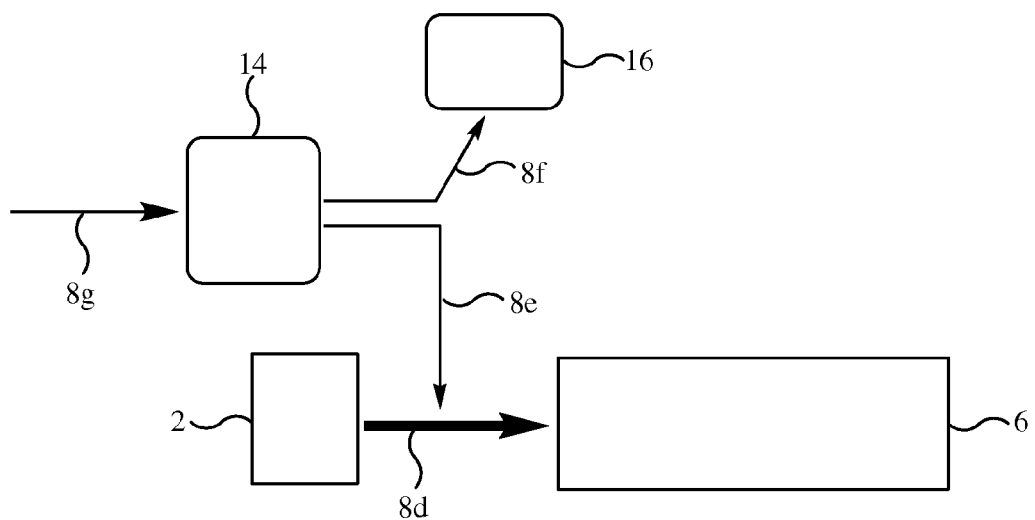
FIG. 2B is a schematic diagram of the placement of the heater and mercury scrubber when a preheater tower is not present in the cement plant.

A configuration of a portion of a cement plant for the methods of this invention showing the placement of the heater 14 and mercury scrubber 16 is shown in FIG. 2A and in FIG. 2B. In FIG. 2A, raw material feed 8d exits the raw material mill 2. Collected particulates 8g are transported from a particulate collection device (not shown) to the heater 14 upstream of the preheater tower 4. The collected particulates 8e exit the heater 14, and are combined with the raw material feed 8d, which is fed to the preheater tower 4. The gas stream 8f containing volatilized mercury and small particulates is routed to the mercury scrubber 16. Similarly, in FIG. 2B, raw material feed 8d exits the raw material mill 2. Collected particulates 8g are transported from the particulate collection device (not shown) to the heater 14 upstream of the kiln 6. The collected particulates 8e exit the heater 14 and are combined with the raw material feed 8d, which is fed to the kiln 6. The gas stream 8f containing volatilized mercury and small particulates is routed to the mercury scrubber 16. Variations on the methods illustrated in FIGS. 2A and 2B are possible and within the scope of the invention.

In the practice of this invention, the heater and the mercury scrubber are preferably in close proximity, but such an arrangement may not be possible, depending on the configuration of the particular cement plant.

The heater can be any type of heater that can heat the raw material feed to the desired temperature. Suitable heaters include rotary kilns, mill heaters, and the like. A heater with a screw feeder inside is preferred in some embodiments, because the screw feeder promotes more uniform heating.

The collected particulates are directed into the heater and are heated to one or more temperatures at or above the volatilization temperature of mercury from the collected particulates, preferably while being transported inside (through) the heater. In the heater, temperatures of at least about 200° C. are generally employed. Preferably, temperatures in the heater are in the range of about 200° C. to about 800° C., and more preferably in the range of about 300° C. to about 700° C. Mercury species typically volatilize from collected particulates at temperatures roughly in the range of 300° C. to 700° C. When the temperature is lower than 300° C., volatilization of mercury is possible, but not very efficient. At temperatures of about 700° C. or greater, the volatilization of mercury does not increase significantly in proportion to the amount of heat energy expended.

After exiting the heater, the collected particulates from which the mercury has been removed (volatilized) are directed toward the kiln. The collected particulates can travel through other structures (such as a preheater tower) at the cement plant prior to entering the kiln, or the collected particulates can be stored, if desired (e.g., if the kiln is shut down for maintenance).

The volatilized mercury exits the heater, usually as part of a gas stream, and is directed to the mercury scrubber. The mercury scrubber contains at least one absorption medium to absorb the mercury directed to the mercury scrubber. The absorbent medium is usually a solid mercury sorbent. In some embodiments, the mercury scrubber also has a moving bed to capture particulates that are contained in the gas stream entering the mercury scrubber.

Capture of particulate matter by the moving bed protects the absorbent medium (or media) in the mercury scrubber which allows the absorbent media to perform for longer periods of time without replacement or re-activation. Suitable sorbents to capture the particulate matter in the moving bed are granular sorbents generally having a size range between about 5 and about 20 U.S. Mesh (0.85 to 4 mm), preferably about 5 to about 7 U.S. Mesh (2.8 to 4 mm). Examples of such sorbents include sand, stone particles, ceramic, glass beans, quartz, and activated carbon. Activated carbon for the moving bed includes unaltered activated carbon and chemically-treated activated carbon, including bromine- or sulfur-impregnated activated carbons.

When the absorbent medium in the mercury scrubber is a solid mercury sorbent, suitable sorbents include activated carbon sorbents, modified activated carbon sorbents, activated carbon fiber sorbents, metals that react with mercury, sulfur, a metal sulfide reacts with mercury, such as sodium sulfide, potassium sulfide, iron sulfide, zinc sulfide, and the like, and mineral sorbents (e.g., silica or zeolites). The sulfur or metal sulfide can be used in powdered form, granular form, or honeycomb form.

The mercury sorbent is preferably an activated carbon sorbent. Granulated or powdered activated carbon can be employed; granulated activated carbon is preferred. In preferred embodiments, the activated carbon sorbent is preferably a bromine-containing activated carbon sorbent. Bromine-containing activated carbon sorbents are formed by treating (contacting) the sorbent with an effective amount of a bromine-containing substance for a sufficient time to increase the ability of the activated carbon to adsorb mercury and mercury-containing compounds. Such contacting of the activated carbon sorbent and a bromine-containing substance significantly increases the sorbent's ability to absorb mercury and mercury-containing compounds. Treatment of the activated carbon sorbent with bromine-containing substance(s) is preferably conducted such that the sorbent has about 0.1 to about 15 wt % bromine. See in this connection U.S. Pat. No. 6,953,494. A preferred bromine-containing activated carbon is available commercially from Albemarle Corporation as B-PAC™.

For the solid mercury sorbents, suitable apparatus include cartridges, fixed beds, moving beds, including continuous cross-flow moving beds, and the like. Fixed beds are preferred.

In the methods of this invention, only the collected particulates are directed to the heater, while the exhaust gas stream is not directed to the heater. This provides certain advantages. The absence of certain the exhaust gas stream from flowing through the heater allows the apparatus holding, supporting, or containing the mercury sorbents to be smaller in size, and minimizes air flow plugging of the apparatus holding, supporting, or containing the mercury sorbents.

In a preferred embodiment of the above method, the gas stream containing the volatilized mercury is fed to at least one and then to at least one other of at least two absorbent media (which may be the same or different) present in the mercury scrubber. In this way, the mercury-containing gas stream can be continuously fed into the mercury scrubber to one absorbent medium, while the other absorbent medium is replaced or recharged, so that as one absorbent medium reaches capacity, the gas stream is switched to the other absorbent medium, which allows mercury-containing gas streams to be continuously processed through the mercury scrubber without material interruption. The gas stream discharged from the mercury scrubber is directed to the particulate collection device, or to the stack.

In conjunction with the above methods, a mercury sorbent optionally and preferably can be injected between the kiln and the particulate collection device. Generally, the mercury sorbent is injected after the kiln (and after the preheater tower, if present). After injection, the mercury sorbent eventually reaches the particulate collection device and becomes part of the collected particulates. A benefit of this optional step in the methods of this invention is the further reduction of mercury emissions from the exhaust gas stream from the cement plant.

A particular advantage of sorbent injection is that mercury emissions are decreased whether or not the raw mill is operating.

In the practice of this invention, the mercury sorbent can be any solid mercury sorbent that is capable of absorbing mercury when injected into a gas stream. Typically, such mercury sorbents include, but are not limited to, activated carbon sorbents, modified activated carbon sorbents, activated carbon fiber sorbents, metals that react with mercury, sulfur, a metal sulfide reacts with mercury, such as sodium sulfide, potassium sulfide, iron sulfide, zinc sulfide, and the like, and mineral sorbents (e.g., silica or zeolites).

The injected mercury sorbent is preferably an activated carbon sorbent. Granulated or powdered activated carbon can be employed; powdered activated carbon is preferred. In preferred embodiments, the activated carbon sorbent is preferably a bromine-containing activated carbon sorbent. Bromine-containing activated carbon sorbents are formed by treating (contacting) the sorbent with an effective amount of a bromine-containing substance for a sufficient time to increase the ability of the activated carbon to adsorb mercury and mercury-containing compounds. Such contacting of the activated carbon sorbent and a bromine-containing substance significantly increases the sorbent's ability to absorb mercury and mercury-containing compounds. Treatment of the activated carbon sorbent with bromine-containing substance(s) is preferably conducted such that the sorbent has about 0.1 to about 15 wt % bromine. See in this connection U.S. Pat. No. 6,953,494. A preferred bromine-containing activated carbon is available commercially from Albemarle Corporation as B-PAC™.

The mercury sorbents are typically injected at a rate of about 0.5 to about 15 lb/MMacf ($8 \times 10^{-6}$ to $240 \times 10^{-6}$ kg/m$^3$). Preferred injection rates are about 1 to about 10 lb/MMacf ($16 \times 10^{-6}$ to $160 \times 10^{-6}$ kg/m$^3$); more preferred are injection rates of about 2 to about 5 lb/MMacf ($32 \times 10^{-6}$ to $80 \times 10^{-6}$ kg/m$^3$), though it is understood that the preferred injection rate varies with the particular system configuration.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

That which is claimed is:

1. A method for reducing emissions of mercury from a cement plant, the cement plant comprising at least a kiln, a particulate collection device, a heater, and a mercury scrubber, wherein the heater is upstream from the kiln and the mercury scrubber is downstream from the heater, the cement plant having therein collected particulates and an exhaust gas stream, which method comprises
    directing the collected particulates and the exhaust gas stream through the heater, to form volatilized mercury species in the exhaust gas stream from the collected particulates;
    directing the collected particulates from the heater downstream toward the kiln;
    directing the exhaust gas stream containing the volatilized mercury species to the mercury scrubber,
    directing the exhaust gas stream from the mercury scrubber to a particulate collection device, and
    directing the exhaust gas stream to exit the particulate collection device and not into the heater.

2. A method as in claim 1 wherein the cement plant further comprises a raw material feed, and wherein at least a portion of the collected particulates from the heater are combined with the raw material feed before the raw material feed enters the kiln.

3. A method as in claim 1 wherein the cement plant further comprises a raw mill, and wherein at least a portion of the collected particulates from the heater are introduced into the raw mill.

4. A method as in claim 1 wherein at least a portion of the collected particulates from the heater are introduced into the kiln.

5. A method as in claim 1 wherein said method further comprises injecting a mercury sorbent at one or more points between the kiln and the particulate collection device.

6. A method as in claim 5 wherein said cement plant further comprises a preheater tower, and wherein the mercury sorbent is not injected before or into the preheater tower.

7. A method as in claim 5 wherein the mercury sorbent is an activated carbon sorbent.

8. A method as in claim 7 wherein said activated carbon sorbent has been treated with an effective amount of a bromine-containing substance for a sufficient time to increase the ability of the activated carbon to adsorb mercury and mercury-containing compounds.

9. A method as in claim 7 wherein the mercury sorbent has about 0.1 to about 15 percent by weight bromine.

10. A method as in claim 5 wherein the injection rate is in the range of about 0.5 lb/MMacf to about 15 lb/MMacf.

11. A method as in claim 1 wherein the mercury scrubber comprises a mercury sorbent, and wherein the mercury sorbent is an activated carbon sorbent.

12. A method as in claim 11 wherein said activated carbon sorbent has been treated with an effective amount of a bromine-containing substance for a sufficient time to increase the ability of the activated carbon to adsorb mercury and mercury-containing compounds.

13. A method as in claim 11 wherein the mercury sorbent has about 0.1 to about 15 percent by weight bromine.

14. A method as in claim 1 wherein the heater is at a temperature in the range of about 200° C. to about 800° C.

15. A method as in claim 1 wherein the mercury scrubber comprising a mercury sorbent, which mercury sorbent is selected from metals that react with mercury, sulfur, metal sulfides that react with mercury, mineral sorbents, and activated carbon that has 0.1 to 15 wt % bromine.

16. A method for reducing emissions of mercury from a cement plant, the cement plant comprising at least a kiln and a particulate collection device, the cement plant having therein collected particulates and an exhaust gas stream, which method comprises
    placing a heater upstream of the kiln such that the collected particulates and the exhaust gas stream will travel through the heater downstream to the kiln;
    placing a mercury scrubber downstream from the heater such that volatilized mercury species formed from the collected particulates can enter the mercury scrubber from the heater;
    directing the collected particulates and the exhaust gas stream through the heater, to form volatilized mercury species in the exhaust gas stream from the collected particulates;
    directing the collected particulates from the heater downstream toward the kiln;
    directing the exhaust gas stream containing the volatilized mercury species to the mercury scrubber,
    directing the exhaust gas stream from the mercury scrubber to a particulate collection device, and
    directing the exhaust gas stream to exit the particulate collection device and not into the heater.

* * * * *